Jan. 31, 1933.   A. ZISKA, JR   1,895,699
ARC WELDING APPARATUS
Filed Aug. 8, 1930
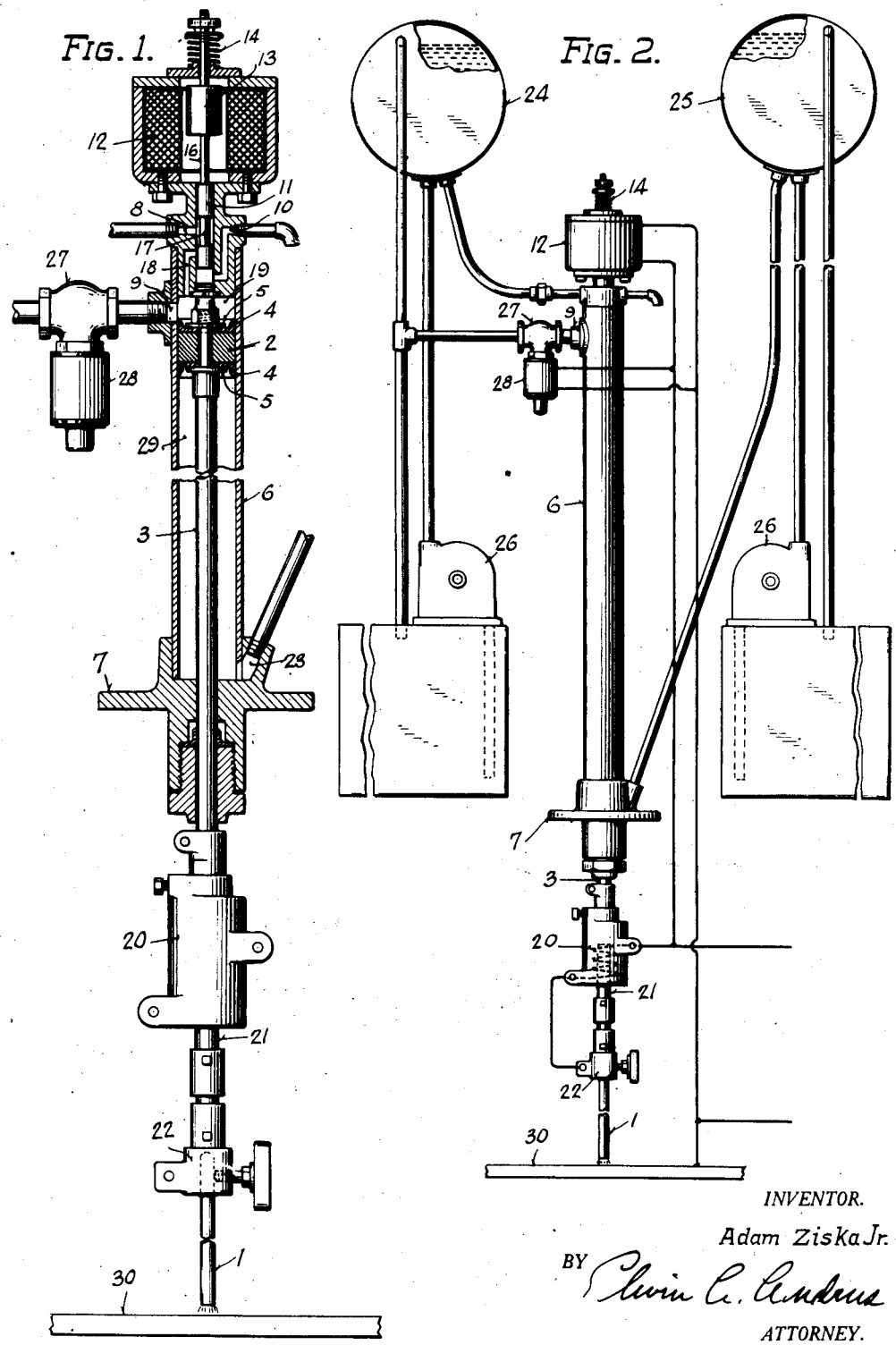
INVENTOR.
Adam Ziska Jr.
BY
ATTORNEY.

a

UNITED STATES PATENT OFFICE

ADAM ZISKA, JR., OF MILWAUKEE, WISCONSIN, ASSIGNOR TO A. O. SMITH CORPORATION, OF MILWAUKEE, WISCONSIN, A CORPORATION OF NEW YORK

ARC WELDING APPARATUS

Application filed August 8, 1930. Serial No. 473,874.

The present invention relates to an electric arc welding apparatus and more particularly to an apparatus for welding with fusible metallic electrodes.

An object of the invention is to provide an apparatus for controlling the arc length by means of a characteristic of the arc during the feeding of electrode material to the work to be welded.

Various other objects will be apparent from the following description and claims. The invention will be best understood by referring to the accompanying drawing in which:

Figure 1 is a front view of a preferred embodiment of the invention, parts of which are shown in section.

Fig. 2 is a front view of the assembly.

The control over the feed and regulation of the weldrod 1 in the present apparatus is effected by means of a hydraulically operated piston 2, which transmits its motion to the weldrod through a suitable piston rod 3. The piston 2 may be of any suitable construction and is sealed against fluid pressure at both ends by cup packing 4 of conventional type, held in place by washers 5. The piston 2 fits snugly but does not bind in a suitable cylinder 6, having a smooth bore. The lower end of the cylinder 6 is supported by a bracket 7. At the upper end of the cylinder 6 a plurality of ports are provided. An inlet 8, hereinafter called the top inlet, provides a supply of fluid under pressure to the upper side of the piston 2. An outlet 9, hereinafter referred to as the exhaust port, provides a passage for the escape of fluid above the piston 2 upon the existence of a predetermined condition in the arc. An air vent 10 is provided beneath the piston valve 11 hereinafter described to insure its smooth operation.

A solenoid 12 connected preferably in shunt to the arc, is secured to the upper extremity of the cylinder 6. The movable core 13 of the solenoid 12 is supported by a spring 14. In operation, the spring 14 opposes the magnetic force of the energized solenoid. An extension 16 of the core 13 is attached to the piston valve 11. The valve 11 comprises a cylindrical piece of metal having a reduced central portion 17 which is of sufficient length to form a passage from the top inlet 8 to the duct 18 for conducting fluid to the chamber 19 in the cylinder 6 above the piston 2. The spring 14 normally tends to hold the valve 11 closed, at which time the feed of the weldrod is stopped.

At the lower end of the piston rod 3, a "pick-up" solenoid 20 for striking the arc is provided. This solenoid is preferably connected in series with the arc and the movable core 21 of the solenoid supports the weldrod 1 and the clamping means 22.

An inlet 23 is provided at the lower end of the cylinder and will be referred to hereinafter as the bottom inlet.

Any suitable source of supply of fluid for the two inlets may be used. In the present embodiment two supply tanks 24 and 25 are placed at a proper height above the apparatus to exert a predetermined pressure at their respective inlets. A pump 26 is used to maintain a substantially uniform supply of the fluid in each of the tanks 24 and 25.

The exhaust port 9 has a valve 27 operated by a solenoid 28 connected either in shunt or in series to the arc to be controlled by a characteristic thereof.

The operation of the apparatus is as follows:

The welding current is turned on, and the shunt solenoid 12 becomes energized, drawing the core 13 downwardly opening the piston valve 11. Fluid under pressure is supplied through the top inlet 8 and enters through the groove 17 in the valve 11, thence through the passage 18 into the chamber 19. Since there is no current across the arc, the maximum voltage will result in the solenoid 12 opening the valve 11 to its greatest extent and supplying a maximum pressure to the chamber 19 overbalancing the pressure below the piston in the chamber 29, and causing the piston 2 and the piston rod 3 to be forced downwardly until the weldrod 1 touches the work 30. This immediately closes the circuit between the weldrod and work, and the arc striking solenoid 20, being in series in the welding circuit, is instantly energized to thereby strike the arc by withdrawing the solenoid core 21 upwardly for a limited distance.

When the weldrod 1 comes into contact with the work 30, the shunt circuit of the solenoid 12 is effected to momentarily deenergize the solenoid. Consequently the valve 11 is closed and the feed of the weldrod 1 is temporarily suspended. When the weldrod 1 becomes heated and begins to fuse away and the arc is lengthened, the feed is resumed because of the increase in voltage drop across the arc.

The rate at which the weldrod is fed downwardly is determined by the arc characteristics. If the arc becomes extremely long by a sudden variation in contour of the work, the valve 11 opens to an extent sufficient to correct the arc length. Under ordinary welding conditions, where the arc does not become abnormally long, the valve 11 may open only a short distance thereby feeding the weldrod at a relatively slower rate.

Another condition which arises in the welding of work having irregular contour is a rapid shortening of the arc because of an elevation or bump along the seam. As the work is fed past the arc, such an elevation might cause the arc to become so shortened that the weldrod would contact with the work and "freeze". This condition is also accommodated by the present invention, for the shortening of the arc to that extent causes the relief valve 27 controlled by the solenoid 28 to be opened and causes the solenoid 12 to become deenergized and the valve 11 to become completely closed. The opening of the relief valve 27 releases the pressure in the chamber 19, and the pressure below the piston 2 in the chamber 29 is sufficiently great to lift said piston, to force the fluid in the chamber 19 out through the relief valve, and to cause the weldrod 1 to be lifted sufficiently to lengthen the arc to its desirable normal length.

If the arc actually becomes extinguished for any reason the arc striking and the feeding of the weldrod will be repeated as described in the above operation.

It is desirable that the relief valve 27 open only when the arc length becomes abnormally short, since the deenergization of the solenoid 12 with the resulting stopping of weldrod fed will correct ordinary shortening of the arc.

The return of the piston rod 3 to its uppermost position for the feeding of a new weldrod may be accomplished by opening the exhaust valve 27 either manually or automatically.

It will be understood that an arc of "normal length" herein referred to, is one which produces the best weld and which is the most desirable under the given welding condition. The arc length may vary within limits depending upon the welding conditions. The purpose of the regulation of the weldrod feed in accordance with the present invention is to maintain the arc length within the desirable normal length and to prevent undesirable fluctuations above and below the normal length which fluctuations tend to produce welds of inferior quality.

It will be understood that various embodiments may be employed within the scope of the appended claims.

I claim:

1. In an electric arc welding apparatus in combination a piston for moving the welding electrode, a cylinder in which said piston reciprocates, fluid under pressure supplied to the cylinder on each side of the piston, and means responsive to an abnormal characteristic of the arc for varying the pressure of the fluid to cause the piston to correctively alter the arc length.

2. An electric arc welding apparatus comprising a fluid operated piston for controlling the movement of the weldrod, and means responsive to a characteristic of the arc for directing the fluid against the piston to correctively alter the arc length when too short or too long.

3. In an electric arc welding apparatus, in combination a hydraulic piston for controlling the movement of the weldrod, a cylinder in which said piston operates, fluid under pressure in said cylinder on each side of said piston, and means responsive to a characteritic of the arc for selectively varying the relative pressure of the fluid on each side of the piston to cause said piston to control the arc length within a predetermined range above and below normal.

4. In an electric arc welding apparatus, a hydraulic piston for controlling the movement of the weldrod, a cylinder in which said piston operates, means for supplying fluid under pressure to said cylinder beneath the piston, and means responsive to an arc characteristic for directing fluid under an overbalancing pressure against the upper side of said piston to cause the piston to descend and feed the weldrod to the work at a rate consistent with the maintenance of an arc of normal length.

5. In an electric arc welding apparatus, a hydraulic piston for controlling the movement of the weldrod, an upright cylinder in which said piston reciprocates, fluid under pressure in said cylinder beneath the piston, means responsive to an arc characteristic for directing an overbalancing pressure against the upper side of said piston to cause the piston to descend and feed the weldrod to the work, and means responsive to a predetermined arc condition for releasing the fluid under pressure above the piston to correctively alter the length of the arc.

6. In an electric arc welding apparatus, a piston disposed to be actuated by fluid pressure, a cylinder in which said piston reciprocates, fluid under pressure in said cylinder above and below said piston, a valve responsive to changes in the arc voltage for directing fluid under pressure against the upper side of the piston to cause the same to feed the welding electrode toward the seam to be welded, and a valve responsive to a predetermined characteristic of the arc for diminishing the pressure above said piston to permit the pressure beneath to raise the piston to correctively alter the arc length.

7. In an electric arc welding apparatus for feeding electrodes, a hydraulically actuated piston for controlling the movement of the welding electrode, a cylinder in which said piston reciprocates, fluid under pressure in said cylinder above and below the piston, and means responsive to voltage across the arc for varying the fluid pressure above the piston to control the rate of feed of the welding electrode.

8. In an electric arc welding apparatus, in combination, a pressure cylinder, a piston movable within the cylinder for controlling the movement of the welding electrode, means for supplying fluid under pressure to either end of the cylinder, and means responsive to a characteristic of the arc for relatively varying the pressures on opposite sides of the piston to control the feeding of the weldrod.

9. In an electric arc welding apparatus, in combination, a fluid pressure piston, a cylinder in which the piston reciprocates, a conduit for directing fluid under constant pressure into one end of the cylinder to bias the piston in one direction, and means under control of the arc for introducing fluid under selectively varying pressures into the other end of the cylinder to control the feeding of the weldrod to maintain an arc.

10. In an apparatus for electric arc welding, in combination, a piston for controlling the feeding of the weldrod, a cylinder in which the piston reciprocates, means for supplying fluid under pressure to the opposite ends of the cylinder responsive to changes in arc voltage disposed to vary the relative pressures in the opposite ends of the cylinder to control the feeding of the weldrod and maintain a substantially constant length of arc.

11. In an arc welding head for feeding electrodes, in combination, a piston, means actuated by the piston for feeding the electrode, means for biasing the piston in one direction, means for moving the piston in opposition to the biasing force to feed the electrode, and means responsive to a characteristic of the arc to interrupt the feeding of the electrode whereby the electrode is moved in the opposite direction under the force of the biasing means.

12. An electric arc welding head for feeding an electrode to an arc, comprising means for carrying an electrode, balanced fluid columns cooperative with the carrying means to feed the electrode at a predetermined speed, and means responsive to a characteristic of the arc for effecting an unbalance of the fluid columns to move the carrying means in either direction to change the length of the arc.

13. An electric arc welding head for feeding electrodes comprising, means for carrying an electrode, fluid pressure means cooperative to feed the electrode to an arc, and means responsive to the characteristics of the arc cooperative with the fluid pressure means, effecting movement of the electrode in either direction to hold an arc of substantially constant length.

In witness whereof I have hereunto signed my name at Milwaukee, Wisconsin, this 1st day of August, 1930.

ADAM ZISKA, Jr.